(12) United States Patent
Chauhan

(10) Patent No.: US 11,715,110 B2
(45) Date of Patent: *Aug. 1, 2023

(54) INTEGRATING AND MANAGING SOCIAL NETWORKING INFORMATION IN AN ON-DEMAND DATABASE SYSTEM

(71) Applicant: salesforce.com, inc., San Francisco, CA (US)

(72) Inventor: Chet Chauhan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,997

(22) Filed: Jun. 15, 2022

(65) Prior Publication Data
US 2022/0383328 A1    Dec. 1, 2022

Related U.S. Application Data

(63) Continuation of application No. 17/249,956, filed on Mar. 19, 2021, now Pat. No. 11,386,434, which is a
(Continued)

(51) Int. Cl.
*G06Q 30/00* (2023.01)
*G06Q 30/01* (2023.01)
(Continued)

(52) U.S. Cl.
CPC .............. *G06Q 30/01* (2013.01); *G06F 16/95* (2019.01); *G06F 16/958* (2019.01);
(Continued)

(58) Field of Classification Search
CPC .... G06F 16/95; G06F 16/9535; G06F 16/958; G06F 15/16; G06Q 30/01;
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Le H Luu
(74) *Attorney, Agent, or Firm* — Weaver Austin Villeneuve & Sampson LLP

(57) ABSTRACT

Some embodiments comprise integrating information from a social network into a multi-tenant database system. A plurality of information from the social network is retrieved, using a processor and a network interface of a server computer in the multi-tenant database system, wherein the plurality of information is associated with a message transmitted using the social network. Metadata related to the transmitted message is generated, using the processor. A conversation object is generated, using the processor, based on the plurality of information associated with the transmitted message and the metadata related to the transmitted message. The conversation object is then stored in an entity in the multi-tenant database system, using the processor of the server computer.

20 Claims, 5 Drawing Sheets

Related U.S. Application Data continuation of application No. 16/676,182, filed on Nov. 6, 2019, now Pat. No. 10,977,661, which is a continuation of application No. 15/374,807, filed on Dec. 9, 2016, now Pat. No. 10,489,790, which is a continuation of application No. 14/145,870, filed on Dec. 31, 2013, now Pat. No. 9,519,711, which is a continuation of application No. 12/917,326, filed on Nov. 1, 2010, now Pat. No. 8,621,015.

(60) Provisional application No. 61/256,861, filed on Oct. 30, 2009.

(51) Int. Cl.

| | | |
|---|---|---|
| *G06F 16/95* | (2019.01) | |
| *G06F 16/958* | (2019.01) | |
| *G06F 16/9535* | (2019.01) | |
| *H04L 51/52* | (2022.01) | |
| *H04L 51/216* | (2022.01) | |
| *G06Q 30/0201* | (2023.01) | |
| *G06Q 50/00* | (2012.01) | |
| *H04L 67/10* | (2022.01) | |

(52) U.S. Cl.
CPC ..... *G06F 16/9535* (2019.01); *G06Q 30/0201* (2013.01); *G06Q 50/01* (2013.01); *H04L 51/216* (2022.05); *H04L 51/52* (2022.05); *H04L 67/10* (2013.01)

(58) Field of Classification Search
CPC ......... G06Q 30/0201; G06Q 30/0277; G06Q 50/01; G06Q 10/0639; G06Q 10/107; H04L 51/216; H04L 51/52; H04L 51/02; H04L 51/212; H04L 51/234; H04L 67/10; H04L 63/1483
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Logmans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Logmans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Logmans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |

(56) References Cited

U.S. PATENT DOCUMENTS

| | | | |
|---|---|---|---|
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,621,015 B2 | 12/2013 | Chauhan | |
| 8,646,103 B2 | 2/2014 | Jakobson et al. | |
| 8,756,275 B2 | 6/2014 | Jakobson | |
| 8,769,004 B2 | 7/2014 | Jakobson | |
| 8,769,017 B2 | 7/2014 | Jakobson | |
| 9,519,711 B2 | 12/2016 | Chauhan | |
| 10,489,790 B2 | 11/2019 | Chauhan | |
| 10,977,661 B2 | 4/2021 | Chauhan | |
| 11,386,434 B2 | 7/2022 | Chauhan | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0214097 A1 | 9/2007 | Parsons et al. | |
| 2008/0249972 A1 | 10/2008 | Dillon | |
| 2009/0012760 A1* | 1/2009 | Schunemann | G06Q 10/0639 703/6 |
| 2009/0063415 A1 | 3/2009 | Chatfield et al. | |
| 2009/0094340 A1* | 4/2009 | Gillai | G06F 15/16 709/206 |
| 2009/0100342 A1 | 4/2009 | Jakobson | |
| 2009/0164233 A1* | 6/2009 | Arnold | G06Q 10/107 705/342 |
| 2009/0177484 A1 | 7/2009 | Davis et al. | |
| 2009/0177744 A1 | 7/2009 | Marlow et al. | |
| 2009/0182832 A1* | 7/2009 | O'Sullivan | H04L 51/212 709/207 |
| 2009/0210507 A1* | 8/2009 | Haverkos | H04L 51/212 709/224 |
| 2009/0307320 A1* | 12/2009 | Golan | H04L 51/212 709/206 |
| 2010/0144318 A1 | 6/2010 | Cable | |
| 2010/0161734 A1* | 6/2010 | Wang | H04L 51/212 709/206 |
| 2010/0223341 A1* | 9/2010 | Manolescu | H04L 51/02 709/224 |
| 2010/0293055 A1* | 11/2010 | Nash | G06Q 30/0277 705/14.69 |
| 2010/0325107 A1 | 12/2010 | Kenton et al. | |
| 2011/0055264 A1* | 3/2011 | Sundelin | G06Q 10/107 709/206 |
| 2011/0218958 A1 | 9/2011 | Warshavsky et al. | |
| 2011/0247051 A1 | 10/2011 | Bulumulla et al. | |
| 2011/0276638 A1* | 11/2011 | Errico | H04L 51/234 709/206 |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0326622 A9* | 12/2013 | Chasin | H04L 63/1483 726/23 |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |
| 2016/0379222 A1 | 12/2016 | Chauhan et al. | |
| 2017/0091776 A1 | 3/2017 | Chauhan | |
| 2019/0197558 A1 | 6/2019 | Chauhan et al. | |
| 2020/0074474 A1 | 3/2020 | Chauhan | |
| 2021/0279738 A1 | 9/2021 | Chauhan | |

OTHER PUBLICATIONS

Microsoft, "E-mail to Case_Lead Using CRM 4 Workflow", Feb. 19, 2008, 20 pages [retrieved on Dec. 9, 2016], Retrieved from the Internet URL: https://blogs.msdn.microsoft.com/crm/2008/02/19/e-mail-to-caselead-using-crm-4-workflow (SALE 1032-4).

Microsoft, "How do I convert an email into a Lead or a Case", Sep. 27, 2006, 7 pages [retrieved on Dec. 9, 2016], Retrieved from the Internet URL: https://blogs.msdn.microsoft.com/crm/2006/09/27/how-do-i-convert-an-email-into-a-lead-or-a-case (SALE 1032-4).

U.S. Notice of Allowance dated Dec. 14, 2020 issued in U.S. Appl. No. 16/676,182.

U.S. Notice of Allowance dated Jan. 26, 2022 issued U.S. Appl. No. 17/249,956.

U.S. Notice of Allowance dated Jul. 29, 2019 issued in U.S. Appl. No. 15/374,807.

U.S. Notice of Allowance dated Aug. 26, 2013 issued in U.S. Appl. No. 12/917,326.

U.S. Notice of Allowance dated Aug. 9, 2016 issued in U.S. Appl. No. 14/145,870.

U.S. Notice of Allowance dated Mar. 9, 2022 in U.S. Appl. No. 17/249,956.

U.S. Office Action dated Nov. 24, 2021 issued in U.S. Appl. No. 17/249,956.

U.S. Office Action dated Nov. 4, 2020 issued in U.S. Appl. No. 16/676,182.

U.S. Office Action dated Dec. 18, 2015 issued in U.S. Appl. No. 14/145,870.

U.S. Office Action dated Apr. 5, 2019 issued in U.S. Appl. No. 15/374,807.

(56) References Cited

OTHER PUBLICATIONS

U.S. Office Action dated May 10, 2013 issued in U.S. Appl. No. 12/917,326.
U.S. Office Action dated Sep. 18, 2012 issued in U.S. Appl. No. 12/917,326.

* cited by examiner

| | (.account) 202 | data 203 | | | 209 |
|---|---|---|---|---|---|
| 201 | Org id | acc id | name | ...... | User ID Ownership |
| org #1 | ood 1<br>ood 1<br>⋮<br>ood 1 | acc 1<br>acc 2<br>⋮ | Enterprise Constellation | | |
| org #2 | ood 2<br>ood 2<br>ood 2 | | | | |
| ⋮ | ⋮ | ⋮ | ⋮ | ⋮ | ⋮ |
| org #N | oodN<br>oodN | | | | |

Table span: 200

*FIG. 3*

INTEGRATING AND MANAGING SOCIAL NETWORKING INFORMATION IN AN ON-DEMAND DATABASE SYSTEM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Social networks, such as Twitter®, Facebook®, and Yammer® have grown in popularity not only for casual social purposes, but also for work-related purposes. Users of social networks post messages related to a company's products and/or services containing information that could be useful to understand customers, track market developments, manage public relations, and address issues related to the company's products and/or services, employees, or the company itself.

SUMMARY

The implementations disclosed herein relate generally to database systems and more particularly to integration of information from social networks into multi-tenant database systems ("MTS"). Embodiments of the implementations are particularly useful for integrating information from social networks such as twitter.com, yammer.com, and other similar services. The implementations described herein provide methods and systems for integrating information harvested from social networks (e.g., posted messages) into a MTS. Various embodiments provide methods and systems for enabling customer support representatives to manage social networks like any other support channel. Various embodiments provide methods and systems for enabling multiple agents to pull, filter, process, search through, and take action based on such harvested information. Various embodiments provide methods and systems for using templates for such harvested information and storing harvested information in a knowledge base to increase productivity.

Some embodiments comprise integrating information from a social network into a multi-tenant database system. A plurality of information from the social network is retrieved, using a processor and a network interface of a server computer in the multi-tenant database system, wherein the plurality of information is associated with a message transmitted using the social network. Metadata related to the transmitted message is generated, using the processor. A conversation object is generated, using the processor, based on the plurality of information associated with the transmitted message and the metadata related to the transmitted message. The conversation object is then stored in an entity in the multi-tenant database system, using the processor of the server computer.

Some embodiments comprise a non-transitory computer-readable medium tangibly encoded with instructions for performing the above-described operations and variations thereof.

Some embodiments comprise a system comprising a processor, a network interface, and a non-transitory computer-readable medium tangibly encoded with instructions for performing the above-described operations and variations thereof.

Reference to the remaining portions of the specification, including the drawings and claims, will realize other features and advantages of the implementations. Further features and advantages of the implementations, as well as the structure and operation of various embodiments, are described in detail below with respect to the accompanying drawings. In the drawings, like reference numbers indicate identical or functionally similar elements.

BRIEF DESCRIPTION OF THE DRAWINGS

FIG. 3 is a schematic illustrating an example of objects represented as a main table in an embodiment.

DETAILED DESCRIPTION

The implementations described herein provide methods and systems for integrating information harvested from social networks (e.g., posted messages) into a MTS. Customer support representatives are able to manage social networks like any other support channel. Multiple agents can pull, filter, process, search through, and take action based on such harvested information. Templates can be used to characterize harvested information and store it into standard object types. Harvested information can be stored in a knowledge base to increase productivity.

Definitions

Each database can generally be viewed as a collection of objects, such as a set of logical tables, containing data fitted into predefined categories. A table, one representation of a data object, is used herein to simplify the conceptual description of objects and custom objects in the present disclosure. It should be understood that the terms table, object and entity may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

As used herein, the term multi-tenant database system ("MTS") refers to those systems in which various elements of hardware and software of the database system may be shared between one or more customers. For example, a given application server may simultaneously process requests for a great number of customers, and a given database table may store rows for a potentially much greater number of customers. In some MTS embodiments, standard entity tables might be provided. For CRM database applications, such standard entities might include tables for relevant data, such as Account, Contact, Lead and Opportunity, each containing predefined fields.

As used herein, the term social network or social networking site refers to any multiuser online system that enables its users to create and preserve connections, communicate by posting broadcast or private messages, and share information with other users of the online system. Examples of social networks include twitter, Facebook, and Yammer.

As used herein, the term message includes any message posted on a social network, including but not limited to status updates, private messages sent to one or more users of the social network, or public messages for broadcast to everyone or to a subgroup of users.

Multi-Tenant Database System (MTS) Overview

Figure 1:
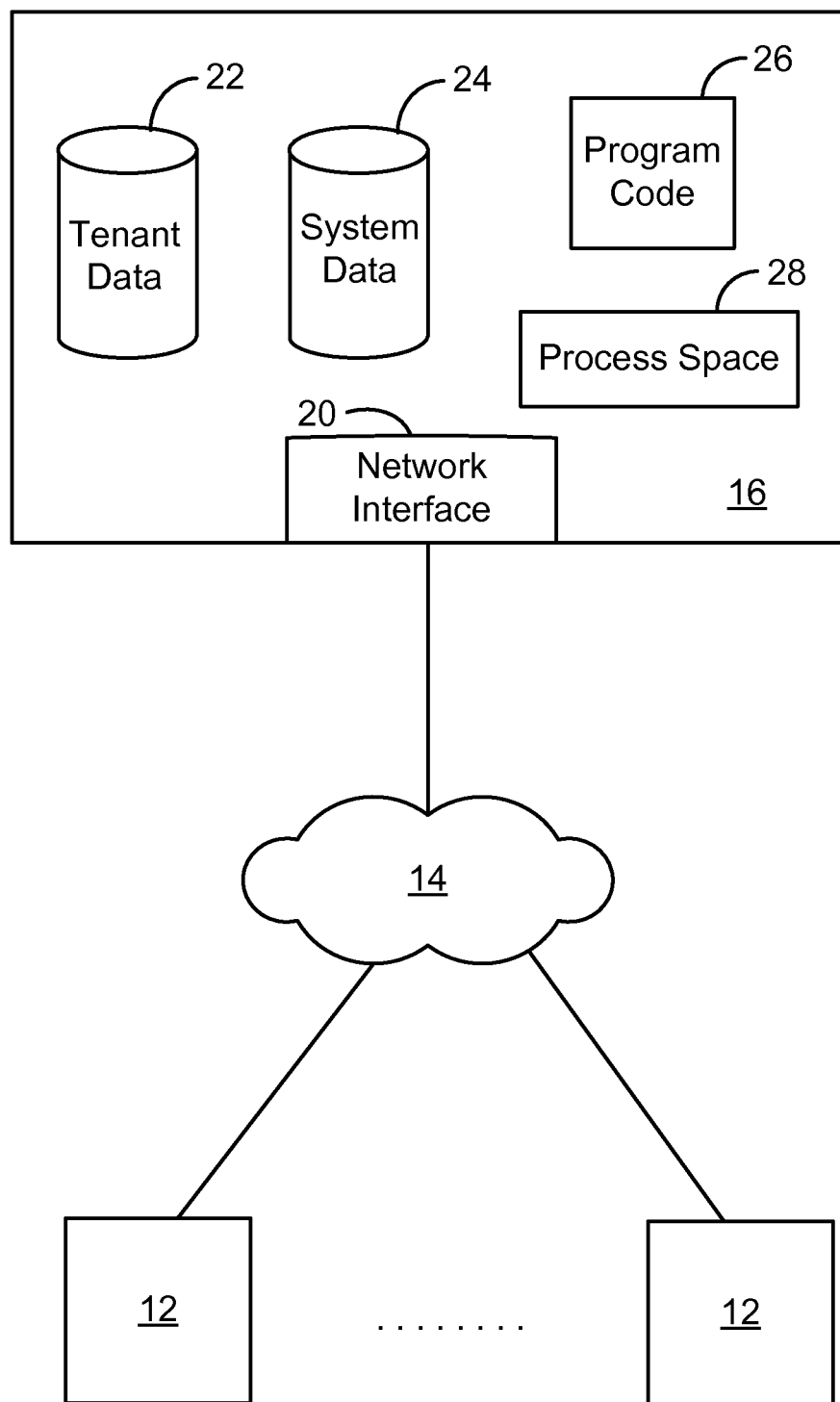
FIG. 1 is a schematic illustrating an environment including a MTS.

FIG. 1 illustrates an environment wherein a MTS might be used. As illustrated in FIG. 1 (and in more detail in FIG. 2) any user systems 12 might interact via a network 14 with a MTS 16. The users of those user systems 12 might be users in differing capacities and the capacity of a particular user system 12 might be entirely determined by the current user. For example, when a salesperson is using a particular user system 12 to interact with MTS 16, that user system has the capacities allotted to that salesperson. However, while an administrator is using that user system to interact with MTS 16, that user system has the capacities allotted to that administrator. Network 14 can be a local area network ("LAN"), wide area network ("WAN"), wireless network, point-to-point network, star network, token ring network, hub network, or other configuration. As the most common type of network in current use is a Transfer Control Protocol and Internet Protocol ("TCP/IP") network such as the global internetwork of networks often referred to as the "Internet" with a capital "I," that will be used in many of the examples herein, but it should be understood that the networks that the system might use are not so limited, although TCP/IP is the currently preferred protocol.

User systems 12 might communicate with MTS 16 using TCP/IP and, at a higher network level, use other common Internet protocols to communicate, such as Hypertext Transfer Protocol ("HTTP"), file transfer protocol ("FTP"), Andrew File System ("AFS"), wireless application protocol ("WAP"), etc. As an example, where HTTP is used, user system 12 might include a HTTP client commonly referred to as a "browser" for sending and receiving HTTP messages from a HTTP server at MTS 16. Such a HTTP server might be implemented as the sole network interface between MTS 16 and network 14, but other techniques might be used as well or instead. In some embodiments, the interface between MTS 16 and network 14 includes load-balancing functionality, such as round-robin HTTP request distributors to balance loads and distribute incoming HTTP requests evenly over a plurality of HTTP servers. Preferably, each of the plurality of HTTP servers has access to the MTS's data, at least as for the users that are accessing that server.

In aspects, the system shown in FIG. 1 implements a web-based customer relationship management ("CRM") system. For example, in one aspect, MTS 16 can include application servers configured to implement and execute CRM software applications as well as provide related data, program code, forms, web pages and other information to and from user systems 12 and to store to, and retrieve from, a database system related data, objects and web page content. With a MTS, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Some elements in the system shown in FIG. 1 include conventional, well-known elements that need not be explained in detail here. For example, each user system 12 could include a desktop personal computer, workstation, laptop, personal digital assistant ("PDA"), cell phone, or any WAP-enabled device or any other computing device capable of interfacing directly or indirectly to the Internet or other network connection. User system 12 typically runs a HTTP client, e.g., a browsing program, such as Microsoft's Internet Explorer® browser, Mozilla's Firefox® browser, Netscape's Navigator® browser, Apple's Safari® browser, the Opera© browser, or a WAP-enabled browser in the case of a cell phone, PDA, or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface ("GUI") provided by the browser on a display (e.g., monitor screen, LCD display, etc.) in conjunction with pages, forms and other information provided by MTS 16 or other systems or servers. As discussed above, the system is suitable for use with the Internet, which refers to a specific global internetwork of networks. However, it should be understood that other networks can be used instead of the Internet, such as an intranet, an extranet, a virtual private network ("VPN"), a non-TCP/IP-based network, any LAN or WAN or the like.

According to one embodiment, each user system 12 and all of its components are operator configurable using applications, such as a browser, including program code run using a central processing unit such as an Intel Pentium® processor or the like. Similarly, MTS 16 (and additional instances of MTS's, where more than one is present) and all of their components might be operator configurable using application(s) including program code run using a central processing unit such as an Intel Pentium processor or the like, or multiple processor units. Program code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk ("CD") medium, digital versatile disk ("DVD") medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, WAP, Ethernet, etc.) as are well known. It will also be appreciated that program code for implementing aspects of the system can be implemented in any programming language that can be executed on a server or server system such as, for example, in C, C++, HTML, Java, JavaScript, WML, any other scripting language, such as VBScript and many other programming languages as are well known.

It should also be understood that each user system 12 may include differing elements, for example, one user system 12 might include a user's personal workstation running Microsoft's Internet Explorer browser while connected to MTS 16 by VPN, another user system 12 might include a thin-client netbook (e.g., Asus Eee PC®) running the Opera browser while connected to MTS 16 through an extranet, and another user system 12 might include a PDA running a WAP-enabled browser while connected to MTS 16 over third-party cellular networks.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS 16 is used, they may be located in close proximity to one another (e.g., in a server farm located in a single building or campus), or they may be distributed at locations remote from one another (e.g., one or more servers located in city A and one or more servers located in city B). Each MTS 16 may include one or more logically and/or physically connected servers distributed locally or across one or more geographic locations. Additionally, the term "server" is meant to include a computer system, including processing hardware and process space(s), and an associated storage system and database application (e.g., relational database management system ("RDBMS")), as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
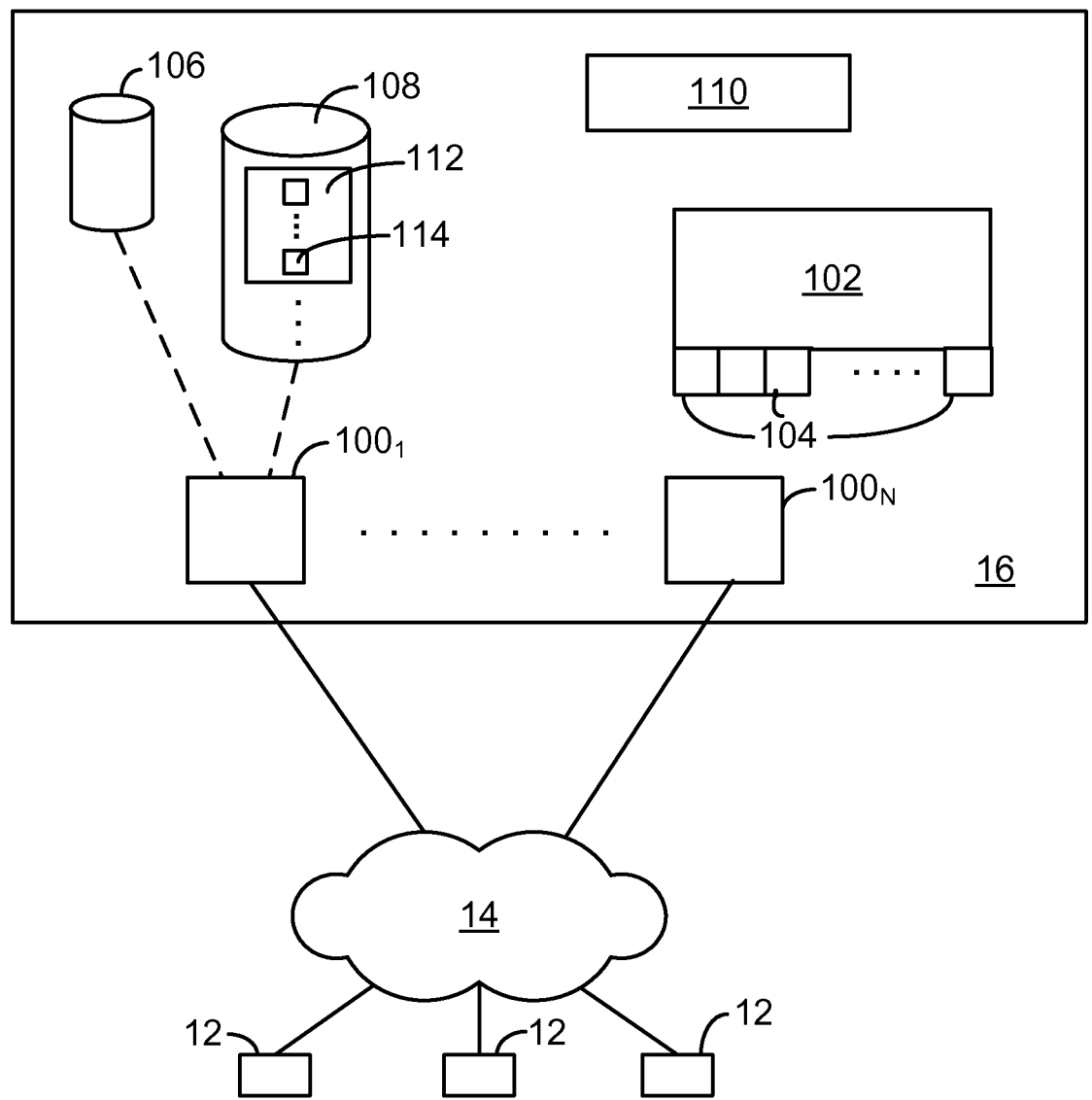
FIG. 2 is a schematic illustrating elements of a MTS and interconnections therein in an embodiment.

FIG. 2 illustrates elements of MTS 16 and various interconnections in an exemplary embodiment. In this example, the network interface is implemented as one or more HTTP application servers 100. Also shown is system process space 102 including individual tenant process space(s) 104, a system database 106, tenant database(s) 108, and a tenant management process space 110. Tenant database 108 might be divided into individual tenant storage areas 112, which can be either a physical arrangement or a logical arrangement. Within each tenant storage area 112, a user storage 114 might similarly be allocated for each user.

It should also be understood that each application server 100 may be communicably coupled to database systems, e.g., system database 106 and tenant database(s) 108, via a different network connection. For example, one application server 100$_1$ might be coupled via the Internet 14, another application server 100$_{N-1}$ might be coupled via a direct network link, and another application server 100$_N$ might be coupled by yet a different network connection. TCP/IP is the currently preferred protocol for communicating between application servers 100 and the database system, however, it will be apparent to one skilled in the art that other transport protocols may be used to optimize the system depending on the network interconnect used.

In aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load-balancing function (e.g., an F5 Big-IP load balancer) is communicably coupled between the application servers 100 and the user systems 30 to distribute requests to the application servers 100. In one aspect, the load balancer uses a least connections algorithm to route user requests to the application servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each user (e.g., a salesperson) uses MTS 16 to manage their sales process. Thus, a user might maintain contact data, leads data, customer follow-up data, performance data, goals and progress data, etc., all applicable to that user's personal sales process (e.g., in tenant database 108). In one MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS, in one implementation, has security protocols that keep data, applications, and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system-level data usable by multiple tenants or other data. Such system-level data might include industry reports, news, postings, and the like that are sharable among tenants.

In certain aspects, user systems 30 communicate with application servers 100 to request and update system-level and tenant-level data from MTS 16; this may require one or more queries to system database 106 and/or tenant database 108. MTS 16 (e.g., an application server 100 in MTS 16) automatically generates one or more SQL statements (a SQL query) designed to access the desired information.

FIG. 3 illustrates an example of an object represented as a main table 200 that holds data items for multiple tenants. In the particular example shown in FIG. 3, the main table 200 (.account) represents a standard Account entity that holds account information for multiple organizations. As shown, main table 200 includes an organization ID column 201 and an account ID column 202 that acts as the primary key for main table 200. For example, for organization #1, column 201 shows that Org ID="ood 1," and two account IDs are listed ("ood 1" and "ood 2"). Main table 200 also includes a plurality of data columns 203 containing other information about each row. For example, for account ID "ood1," information is stored about the account name (i.e., "Enterprise"). Main table 200 may also include column 209 that stores the user ID of the user that owns or created the specific account that is stored in that row.

The organization ID column 201 is provided to distinguish among organizations using the MTS. As shown, N different organizations have data stored in main table 200. In an exemplary embodiment, the organization IDs in column 201 are defined as Char(15), but may be defined as other data types. In one embodiment, the first 3 characters of the organization ID is set to a predefined prefix, such as "ood", although another subset of characters in the organization ID may be used to hold such a prefix if desired.

In the particular example of FIG. 3, where the table represents a standard entity, data columns 203 are predefined data columns, or standard fields, that are provided to the various organizations that might use the table. In the Account entity example described above, such standard fields might include a name column, a site column, a number of employees column and others as would be useful for storing account-related information. Each of the data columns 203 is preferably defined to store a single data type per column.

Integration Environment

Figure 4:
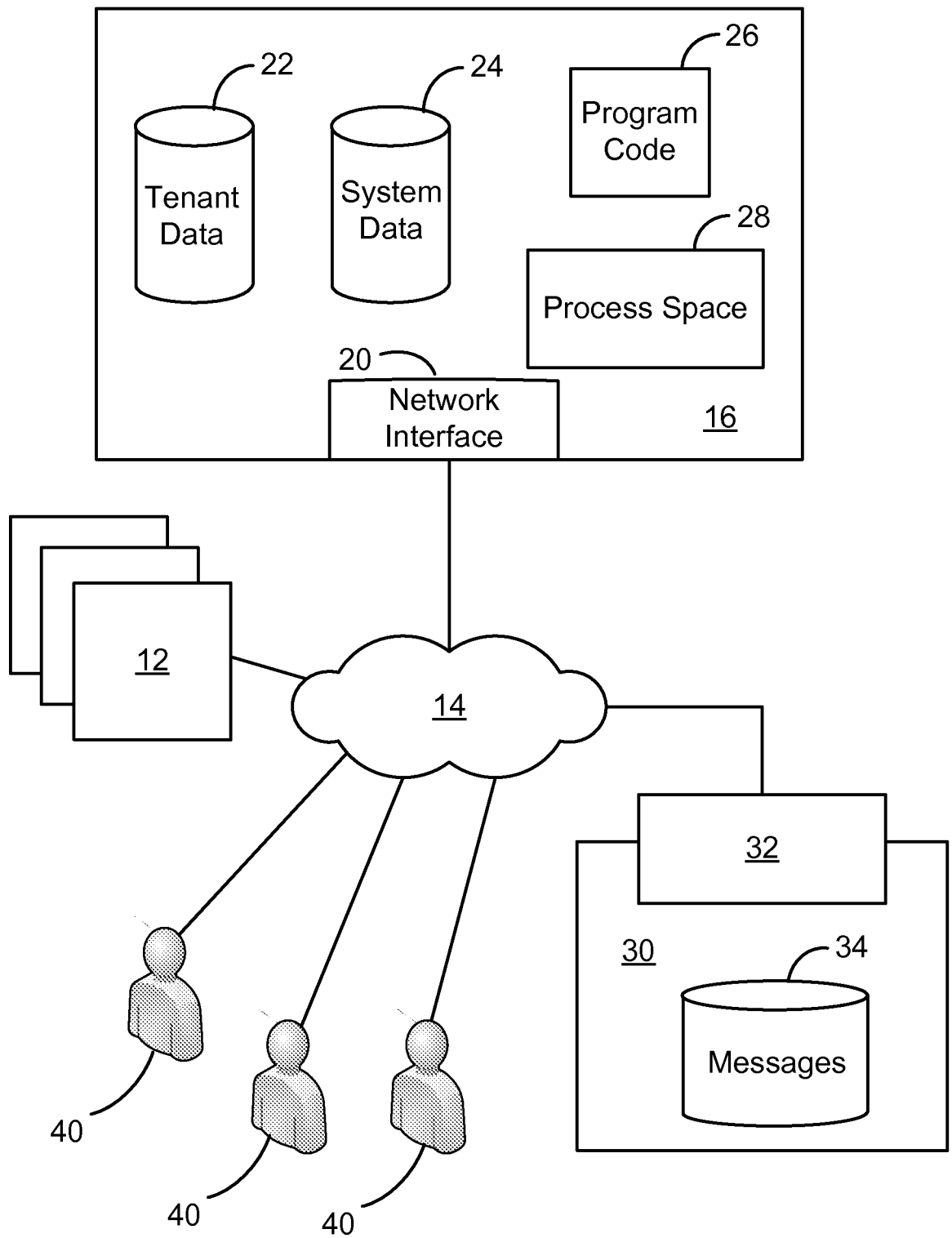
FIG. 4 is a schematic illustrating an example system for integrating and managing social networking information in a MTS in an embodiment.

FIG. 4 illustrates a MTS environment for integrating and managing information pulled from a social network, such as twitter, Facebook, or Yammer. As illustrated in FIG. 4, social network 30 is accessible by MTS 16 via a network 14. The members 40 of social network 30 also access social network 30 via network 14. Social network 30 is able to receive a message from a first member 40 that is then transmitted to one or more members 40 of social network 30. Messages may be stored in a data store 34. An interface 32 may be provided in order to provide a user interface for members 40. Interface 32 may also provide an API through which MTS 16 is able to retrieve the messages in data store 34 and transmit both new messages and message replies through the social network 30. Members 40 may be able to access social network 30 using any conventional Internet-connected device, including but not limited to a personal computer, a cellphone, a portable computing device, etc.

In an example embodiment, social network 30 is the twitter social network. A member 40 of twitter can broadcast a message (i.e., tweet) to all members of the twitter social network who are following tweets by the member 40. A member 40 of twitter can also send a targeted message to a single, identified member of twitter, or to a group of members.

In an example embodiment, the MTS periodically polls the social network for new transmissions of messages and pulls information related to each newly transmitted message; this information is stored in the MTS in the form of a Conversation object. In an example embodiment wherein social network 30 is twitter, the MTS polls twitter's search API on a regular basis and stores all search results as twitter Conversation objects. Each twitter Conversation object is stored as a record in an entity of the MTS. An exemplary embodiment of a Conversation object for twitter is described in the table below.

Example Embodiment of a Conversation Object for Twitter

| Field | Data Type | Description |
| --- | --- | --- |
| Twitter Conversation Id | Auto Number | The Row Id where the Conversation object is stored in an entity of the MTS. |
| Twitter Id | Text(100) (External Id) | The Id of the message on twitter - pulled back via the API. |
| Content | Text[140] | The actual contents of the message (e.g., RT @EBF2010 European Banking Forum event looking at how to drive revenue; customer solutions, operational efficiency, and risk management). For twitter, this field may be limited to 140 characters. |
| Published Date | Date Time | The date and time the message was originally tweeted on twitter. |
| Author Name | Text(255) | The text name of the person that sent the message. |
| Twitter Profile | URL(255) | A URL to the author's twitter profile. |
| Type | Picklist | The source of the message, e.g., @reply, direct message, and Search. |
| Status | Picklist | The status or disposition of the conversation. As users process each conversation, they will disposition the conversation as to what happened. Values include: no action, ignore, case created, promoted to knowledge, solved by community, promoted to lead, etc. |
| Avatar Icon | Text field with URL to the avatar image | Shows the user's image on twitter. The icon may be resized to a fixed standard size so that it fits nicely in a List View or related list. Typically this field will be displayed next to the user's name. |
| Case Id | Lookup | This is a foreign key to the Case that is filled in for any twitter conversation that is promoted to a Case. |

| Field | Data Type | Description |
| --- | --- | --- |
| Contact Id | Lookup | This is a foreign key to the Contact object. If the message is linked to an existing contact with a twitter username, this field should be set to the contact the message was associated with. |
| Lead Id | Lookup | If the message is "promoted" into a lead, this should specify the field LeadId that the message was converted into. |
| Solution Id | Lookup | A foreign key for the solution for any message that is promoted to a solution. |
| Twitter Search Setup Id | Lookup | A foreign key to the twitter search setup record that created this twitter Conversation Object |
| Owner | Lookup to User or Group | The person(s) or queue that is assigned to look at this twitter conversation; this may be specified in the twitter search setup where you specify the owner for the results. |
| Campaign Id | Lookup | Link to Campaign record |
| In Reply to Status Id | Text(255) | Hidden field used to keep track of twitter threads |
| In Reply to Use Id | Text(255) | Hidden field used to keep track of twitter threads |
| Solution Created | Hyperlink formula field | Icon to show that a solution is attached to this twitter conversation |
| Case Created | Hyperlink formula field | Icon to show that a case is attached to this twitter conversation |
| Lead Created | Hyperlink formula field | Icon to show that a lead is attached to this twitter conversation |

Integrating Information from a Social Network into a MTS

Figure 5:
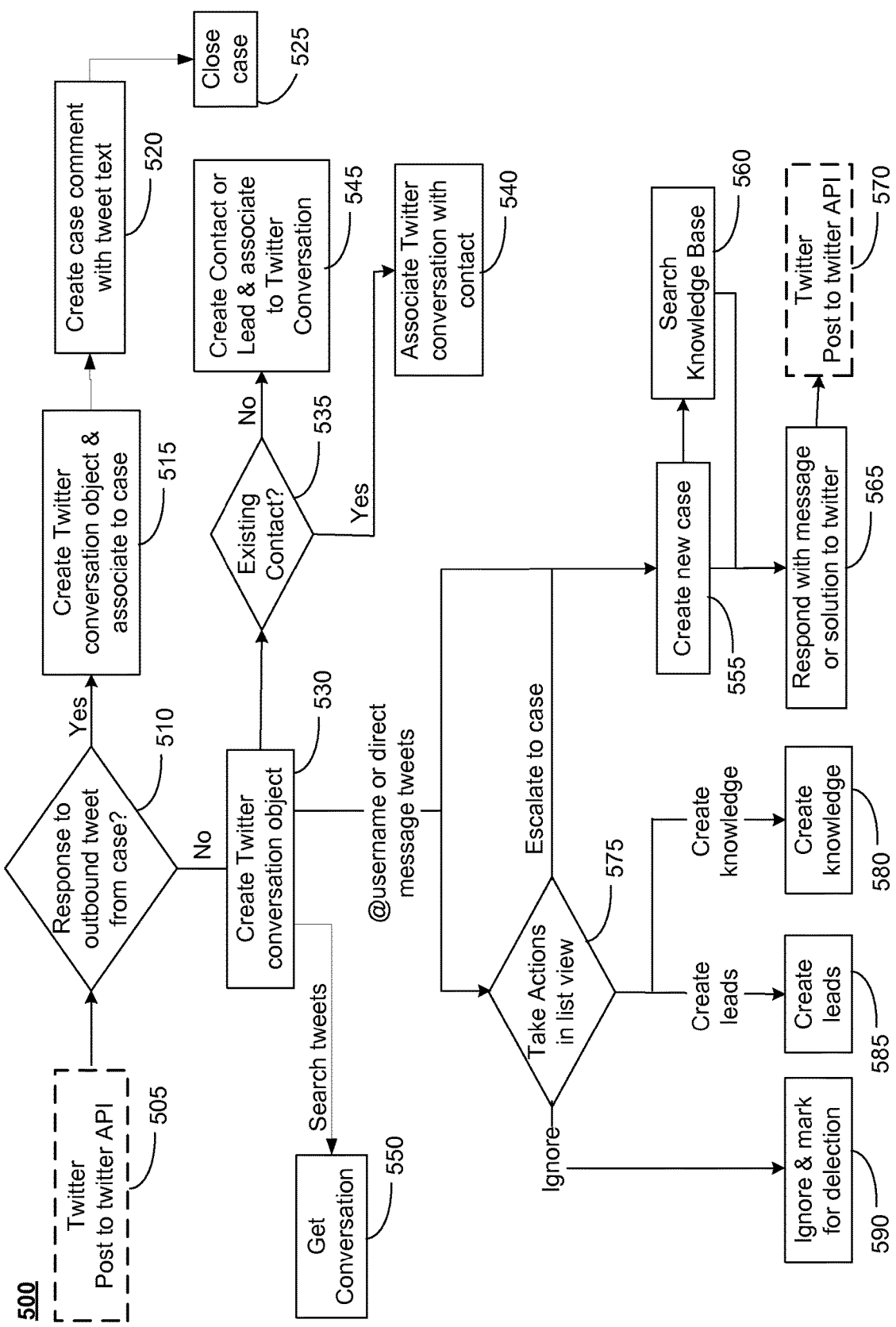
FIG. 5 illustrates an example process flow for an integration with the twitter social network.

FIG. 5 illustrates an example process flow 500 for one embodiment of an integration with the twitter social network A message (i.e., tweet) is transmitted via the twitter social network, so when the MTS polls twitter's search API, the newly transmitted message is detected (505). In one embodiment, a user can define message filters to refine the search results.

If the message is a response to an earlier outbound message related to an existing case (510), then the user may create a Conversation object in the MTS and associate it with the existing case (515). The user can then create a case comment using the message text (520), and the case can be closed if it is appropriate to do so (525).

If the message is not a response to an earlier outbound message related to an existing case (510), then the user may create a new Conversation object (530) in the MTS. The MTS may then search through existing contacts and/or leads to see if the message was sent by an existing contact (535). If so, the MTS may associate the Conversation object with the existing contact (540). In one embodiment, if more than one existing contact and/or lead appears in the search results, then one of the following actions may be taken: (1) no association will be created, or (2) associations are created with all existing contacts and/or leads appearing in the search results, or (3) an association will be created with the most recent contact or lead. If the message was not sent by an existing contact (535), the MTS may create a new Contact or Lead and associate it with the Conversation object (545). In one embodiment, the Contact or Lead object includes a custom field to store the twitter username for the new contact.

If the message is a search tweet (i.e., a publicly broadcast status update), the MTS may retrieve the prior conversation, if any (550). If the message is an @username tweet (i.e., a publicly accessible targeted message) or direct message tweet (i.e., a private message), the user may be able to determine that the content of the message warrants creation of a new case and create a new case (555) and search the knowledge base (560) to see if there is an existing solution or any further information. If there is, then the user may be able to respond to the message to communicate the solution or further information (565)—the MTS may post the response to the twitter API (570).

In one embodiment, the user may be able to view a plurality of messages in a list view, select particular messages, and take actions upon the selected messages in the list (575). The user may be able to escalate a selected message to a case and create a new case (555). The user may be able to use the selected message to create a new knowledge base article (580). The user may be able to use the selected message to create a new lead (585). Or, the user may be able to choose to ignore the selected message and mark it for deletion (590). In one embodiment, the user may be able to change the status of the selected message (e.g., "solved by community") or change other metadata related to the selected message.

In one embodiment, when a new Conversation object is created based on a transmitted message, metadata related to the transmitted message is generated and stored along with the Conversation object in the MTS. In one embodiment, when a new Conversation object is created, it can be categorized in accordance with any of a number of aspects, including but not limited to the message content, the author of the message, the recipient of the message, the date and/or time of the message, the case or lead or knowledge base article with which the message is associated, etc.

In one embodiment, messages from certain users (e.g., usernames belonging to MTS system administrators) may be filtered out in the search results.

User Interface

In one embodiment, the search for newly transmitted messages may be triggered manually. In one embodiment, the search for newly transmitted messages may be run automatically, possibly on a periodic basis. In one embodiment, the user can enable auto-creation of cases, leads, and/or contact In one embodiment, outbound messages destined for the social network can be generated from several locations in the user interface—when the user is viewing a case, a Conversation object, a contact, and/or a lead. In one embodiment, the user interface allows creation of an outbound message from within the MTS user interface. In one embodiment, the user interface allows creation of an outbound message directly from the social network's user interface.

In one embodiment, once an action has been taken on a message (e.g., create case, create lead, ignore), the user interface indicates that an action has been taken on the message; in one embodiment, the user interface indicates the exact disposition of the message.

Setup and Administration

In one embodiment, a Search object is created in order to define various search terms for use when searching for messages in the social network. In one embodiment, multiple instances of Search objects may be created. Each search instance may have an associated owner (either username or queue). All conversations that are pulled in as a result of the Search object may be assigned to the owner associated with the search object. For example, conversations pulled in using the search terms "comcast issue"+"comcast problem" are assigned to the owner "twitter service." In another example, conversations pulled in using the search terms "Verizon offer"+"which cable company" are assigned to the owner "twitter sales."

Example Embodiment of a Search Object for Twitter Integration

| | | |
|---|---|---|
| Twitter Search TermId | AutoNumber | The Row Id for the twitter search in salesforce. |
| Twitter Keyword Search | Text Area(255) | The Twitter search term |
| Owner | Lookup | Lookup to User/Queue. All incoming twitter conversations from this search will be assigned to this queue. |
| Unknown twitter usernames | Picklist [Do nothing, Create Contact, Create Lead] | If "Create Contact", Contacts will automatically be created for unknown twitter users associated with Conversations. If "Create Lead", Leads will automatically be created for unknown twitter users associated with Twitter Conversations. If Do nothing", no object is created for unknown twitter users associated with Twitter Conversations. If the twitter user exists as a known contact then it should not create a contact or lead |
| Lead Association Setting | Picklist | Options: |
| Twitter Max Twitter ID | Text(255) | Hidden field |
| Twitter Max Message ID | Text(255) | Hidden field |
| Twitter Max Search Id | Text(255) | Hidden field |
| Twitter Account ID | Text(255) | Hidden field |
| Last Run Status | Picklist | Hidden field |
| Error Msg | TextArea(255) | Hidden field |
| Next API Reset Time | Date/Time | Hidden field |
| Twitter Max In Progress Id | Text(255) | Hidden field |

In one embodiment, reports can be generated to determine various statistics, which may include: how many messages were pulled in by the search, how many messages were reviewed, how many messages were promoted to cases or leads or knowledge base articles, how many messages were ignored, and how many messages are left to be dealt with.

In one embodiment, an Account object is created in order to enable system administrators to keep track of necessary user account information, wherein the user account is related to the social network.

Example Embodiment of an Account Object for Twitter Integration

| | | |
|---|---|---|
| Twitter Account Id | AutoNumber | The Row Id for the twitter account in salesforce. |
| Username | Text(100) | twitter username |
| Password | Text(50) | twitter password |
| Owner | Lookup | User/Queue lookup: this is the owner of the twitter account. It can be a user or a queue If private, then this can be used to control visibility to the account. |
| Enable Auto-Case Creation | Checkbox | When checked, Cases and Contacts will automatically be created for incoming twitter replies and direct messages. |
| Unknown twitter usernames | Picklist [Do nothing Create Contact, Create Lead] | If "Create Contact", Contacts will automatically be created for unknown twitter users associated with, twitter conversations. If "Create Lead", |

-continued

| | | |
|---|---|---|
| Twitter Account Id | AutoNumber | The Row Id for the twitter account in salesforce. |
| | | Leads will automatically be created for unknown twitter users associated with Twitter Conversations. If "Do nothing", no object is created for unknown twitter users associated with Twitter Conversations. If the twitter user exists as a known contact then it should not create a contact or lead |
| Bit.ly username | Text(50) | Username needed to create the shortened URL |
| Bit.ly password | Text(100) | Stores the apiKEY to access the bit.ly API and generate the shortened URL. |

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system associated with providing insights to database records for viewing, the system comprising:
   a server system comprising one or more processors, the server system configurable to cause:
      processing a message for posting to an account of an organization on a social media site;
      designating a set members of the social media site as an audience;
      processing one or more instructions to match a collection of contacts stored on a database system to the audience of social media site members;
      performing matching of the contacts in association with the social media site members, including:
         identifying an incoming lead for either updating an existing lead or creating a new lead,
         linking the incoming lead to one or more of the contacts, and
         updating the one or more contacts with matching information from the incoming lead;
      tracking the matching information from the incoming lead using a lead record stored on a database; and
      providing, for display in a user interface, details of the lead record responsive to selection of the lead record from a list.

2. The system of claim 1, the server system further configurable to cause:
   monitoring for contacts that have submitted forms associated with lead generation; and
   finding social media profiles that match the monitored contacts.

3. The system of claim 1, the server system further configurable to cause:
   identifying the one or more contacts as a match to the incoming lead.

4. The system of claim 1, the server system further configurable to cause:
   creating the one or more contacts for the incoming lead.

5. The system of claim 1, the server system further configurable to cause:
   using one or more lead generation forms to import the incoming lead.

6. The system of claim 1, wherein the social media site includes one or more of: Facebook or Twitter.

7. The system of claim 1, wherein updating the one or more contacts with matching information from the incoming lead comprises:
   populating a username field of the one or more contacts with a user ID of an author of the message.

8. A non-transitory computer-readable medium storing computer program instructions capable of being executed by one or more processors, the instructions configurable to cause:
   processing a message for posting to an account of an organization on a social media site;
   designating a set members of the social media site as an audience;
   processing one or more instructions to match a collection of contacts stored on a database system to the audience of social media site members;
   performing matching of the contacts in association with the social media site members, including:
      identifying an incoming lead for either updating an existing lead or creating a new lead,
      linking the incoming lead to one or more of the contacts, and
      updating the one or more contacts with matching information from the incoming lead;
   tracking the matching information from the incoming lead using a lead record stored on a database; and
   providing, for display in a user interface, details of the lead record responsive to selection of the lead record from a list.

9. The non-transitory computer-readable medium of claim 8, the instructions further configurable to cause:
   monitoring for contacts that have submitted forms associated with lead generation; and
   finding social media profiles that match the monitored contacts.

10. The non-transitory computer-readable medium of claim 8, the instructions further configurable to cause:
    identifying the one or more contacts as a match to the incoming lead.

11. The non-transitory computer-readable medium of claim 8, the instructions further configurable to cause:
    creating the one or more contacts for the incoming lead.

12. The non-transitory computer-readable medium of claim 8, the instructions further configurable to cause:
    using one or more lead generation forms to import the incoming lead.

13. The non-transitory computer-readable medium of claim 8, wherein the social media site includes one or more of: Facebook or Twitter.

14. The non-transitory computer-readable medium of claim 8, wherein updating the one or more contacts with matching information from the incoming lead comprises:

populating a username field of the one or more contacts with a user ID of an author of the message.

15. A computer-implemented method comprising:

processing a message for posting to an account of an organization on a social media site;

designating a set members of the social media site as an audience;

processing one or more instructions to match a collection of contacts stored on a database system to the audience of social media site members;

performing matching of the contacts in association with the social media site members, including:

identifying an incoming lead for either updating an existing lead or creating a new lead, linking the incoming lead to one or more of the contacts, and updating the one or more contacts with matching information from the incoming lead;

tracking the matching information from the incoming lead using a lead record stored on a database; and providing, for display in a user interface, details of the lead record responsive to selection of the lead record from a list.

16. The computer-implemented method of claim 15, further comprising:

monitoring for contacts that have submitted forms associated with lead generation; and finding social media profiles that match the monitored contacts.

17. The computer-implemented method of claim 15, further comprising:

identifying the one or more contacts as a match to the incoming lead.

18. The computer-implemented method of claim 15, further comprising:

creating the one or more contacts for the incoming lead.

19. The computer-implemented method of claim 15, further comprising:

using one or more lead generation forms to import the incoming lead.

20. The computer-implemented method of claim 15, wherein the social media site includes one or more of: Facebook or Twitter.

* * * * *